United States Patent
Zhang et al.

(10) Patent No.: US 11,695,819 B2
(45) Date of Patent: Jul. 4, 2023

(54) SECURING IMAGE DATA FROM UNINTENDED DISCLOSURE AT A VIDEOCONFERENCING ENDPOINT

(71) Applicant: PLANTRONICS, INC., Santa Cruz, CA (US)

(72) Inventors: Kui Zhang, Round Rock, TX (US); Varun Ajay Kulkarni, Cedar Park, TX (US); Raghavendra Balavalikar Krishnamurthy, Austin, TX (US); Rajen Bhatt, McDonald, PA (US); Stephen Schaefer, Austin, TX (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 17/456,975

(22) Filed: Nov. 30, 2021

(65) Prior Publication Data
US 2023/0171300 A1   Jun. 1, 2023

(51) Int. Cl.
*H04L 65/403* (2022.01)
*H04L 65/75* (2022.01)
*G06V 20/40* (2022.01)
*H04N 1/44* (2006.01)

(52) U.S. Cl.
CPC ........... *H04L 65/762* (2022.05); *G06V 20/46* (2022.01); *H04L 65/403* (2013.01); *H04N 1/4493* (2013.01)

(58) Field of Classification Search
CPC ........ H04L 65/60; H04L 65/403; H04N 1/44; H04N 7/15; H04N 7/147; G06V 20/40
USPC ............................................ 348/14.01–14.16
See application file for complete search history.

(56) References Cited

U.S. PATENT DOCUMENTS

| | | | |
|---|---|---|---|
| 10,169,850 B1 * | 1/2019 | Carey ................. | H04N 7/147 |
| 10,440,324 B1 * | 10/2019 | Lichtenberg ........ | H04L 65/1104 |
| 10,972,655 B1 * | 4/2021 | Ostap ................. | H04N 5/23296 |
| 2012/0007940 A1 * | 1/2012 | Michrowski .......... | H04N 5/272 348/E7.083 |
| 2012/0026277 A1 * | 2/2012 | Malzbender .......... | H04N 7/147 348/E7.083 |
| 2020/0211201 A1 * | 7/2020 | Chiang ................ | G06V 40/172 |

FOREIGN PATENT DOCUMENTS

WO   WO-2021207747 A2 * 10/2021

OTHER PUBLICATIONS

Khan, Faisal, Saqib Salahuddin, and Hossein Javidnia. "Deep Learning-Based Monocular Depth Estimation Methods—A State-of-the-Art Review" Sensors 20, No. 8: 2272. (2020) https://doi.org/10.3390/s20082272.
IBM—What Is Computer Vision?, Automation, Oct. 22, 2021, (9 pages) http://www.ibm.com/topics/computer-vision.

* cited by examiner

*Primary Examiner* — Melur Ramakrishnaiah
(74) *Attorney, Agent, or Firm* — Quarles & Brady LLP

(57) ABSTRACT

A system for preventing private image data captured at an endpoint from being shared during a videoconference is provided. A user can select three-dimensional regions which will not be seen during a videoconference while areas in front of the designated regions remain viewable.

19 Claims, 9 Drawing Sheets

SECURING IMAGE DATA FROM UNINTENDED DISCLOSURE AT A VIDEOCONFERENCING ENDPOINT

BACKGROUND OF THE INVENTION

Field of the Invention

The present invention relates generally to videoconferencing and relates particularly to systems and methods to prevent undesirable or extraneous image data from being transmitted from one videoconferencing endpoint to another.

Description of the Related Art

During a videoconference, people at a videoconferencing endpoint interact with people at one or more other videoconferencing endpoints. Such interaction involves using an image capture device at a first videoconferencing endpoint to capture image data frames for transmission to a remote endpoint. However, there may be image data captured at the first endpoint which users at the first endpoint do not want shared with the remote endpoint.

It is therefore desirable to have an improved videoconferencing system which enables a user to designate areas at a videoconferencing endpoint such that these areas will not be visible to a remote endpoint during a videoconference.

SUMMARY OF THE INVENTION

A system, method, and computer readable medium are disclosed that enable a meeting participant at a videoconferencing endpoint to prevent image data from one or more areas at the videoconferencing endpoint from being shared with a remote endpoint. A view of a room at the videoconferencing endpoint is rendered on a display device. Based on the displayed room view, a user is able to select—in three-dimensions—areas in the room which will not be shared.

In one embodiment, a computer-implementable method for preventing extraneous image data from being shared by a videoconferencing endpoint is provided, where the method includes: capturing a first image data frame using an image capture device of the videoconferencing endpoint, the image capture device having a field of view; extracting, using a processor of the videoconferencing endpoint, a depth of the first image data frame; extracting, using the processor, prominent visual patterns from the first image data frame; constructing, using the processor, a virtual three-dimensional view based, at least in part, on the depth of the first image data frame and the prominent visual patterns from the first image data frame; displaying a depiction of the virtual three-dimensional view using an electronic display device, the depiction of the virtual three-dimensional view containing one or more selectable planes; receiving, at the processor, a selection corresponding to a plane from among the one or more selectable planes; and designating a region which is behind the plane as a region of exclusion, whereby captured image data emanating from the region of exclusion is excluded from transmission to a remote endpoint.

Another embodiment provides a videoconferencing system that includes: a processor; a display device; an image capture device configured to capture a series of visual data frames for processing by the processor; a memory configured to store one or more visual data frames; a network interface configured to transmit visual data frames to a remote endpoint; a data bus coupled to the processor, the display device, the image capture device, the network interface, and the memory; and a non-transitory, computer-readable storage medium, coupled to the data bus, and storing computer program code executable by the processor. The computer program code comprises a computer program code instructions configured to: capture a first image data frame using the image capture device, the first image data frame corresponding to a field of view of the image capture device; extract a depth of the first image data frame; extract prominent visual patterns from the first image data frame; construct a virtual three-dimensional view based, at least in part, on the depth of the first image data frame and the prominent visual patterns from the first image data frame; display a depiction of the virtual three-dimensional view using the display device, the depiction of the virtual three-dimensional view containing one or more selectable planes; receive a selection corresponding to a plane from among the one or more selectable planes; and designate a region which is behind the plane as a region of exclusion, whereby captured image data emanating from the region of exclusion is excluded from transmission to a remote endpoint.

In another embodiment, a non-transitory computer readable medium storing instructions executable by one or more processors is provided, wherein the instructions comprise instructions to: capture a first image data frame using an image capture device, the first image data frame corresponding to a field of view of the image capture device; extract a depth of the first image data frame; extract prominent visual patterns from the first image data frame; construct a virtual three-dimensional view based, at least in part, on the depth of the first image data frame and the prominent visual patterns from the first image data frame; display a depiction of the virtual three-dimensional view using a display device, the depiction of the virtual three-dimensional view containing one or more selectable planes; receive a selection corresponding to a plane from among the one or more selectable planes; and designate a region which is behind the plane as a region of exclusion, whereby captured image data emanating from the region of exclusion is excluded from transmission to a remote endpoint.

In another embodiment, a method of operating a videoconferencing endpoint is provided, the method comprising: capturing a first image data frame using an image capture device of a videoconferencing endpoint, the first image data frame depicting a scene at the videoconferencing endpoint; detecting image data indicative of a head within a polygonal region of the first image data frame; determining that the image data indicative of the head corresponds to a pixel height below a threshold corresponding to the polygonal region; and excluding the image data indicative of the head from transmission to a remote endpoint as part of a visual data stream.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1A:
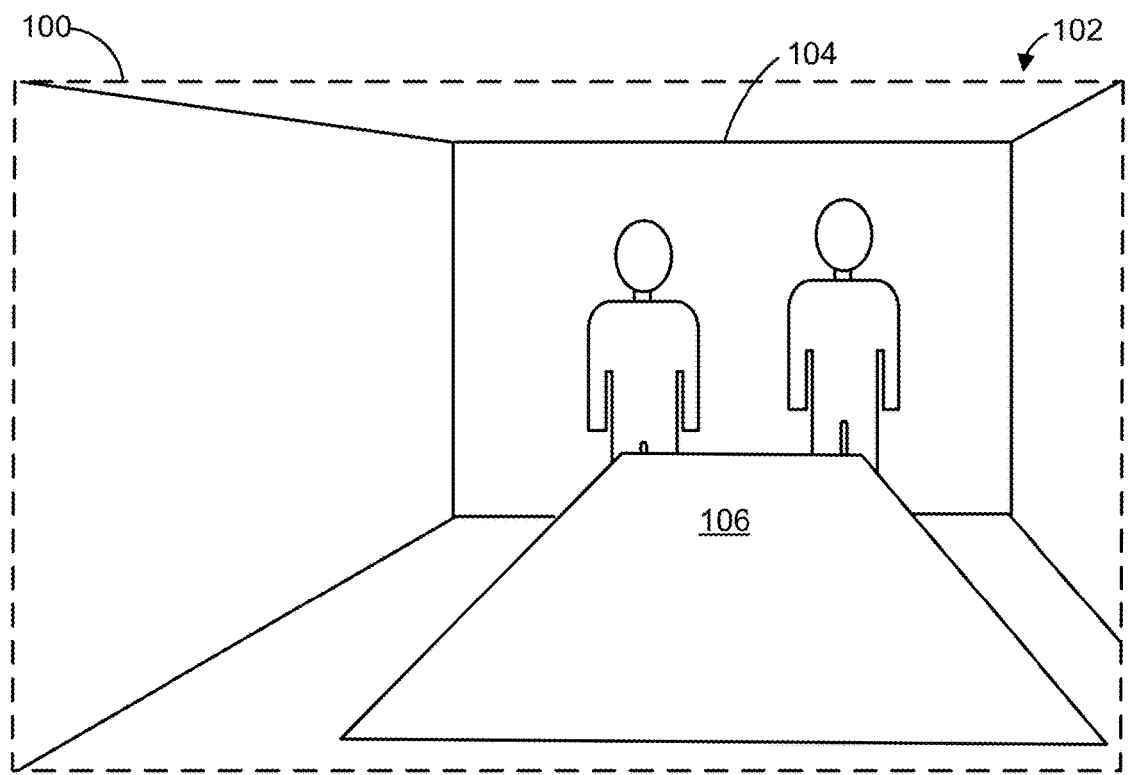
FIG. 1A illustrates a room view, in accordance with an embodiment of this disclosure.

A system, method, and computer readable medium are disclosed that enable a meeting participant at a videoconferencing endpoint to prevent image data from one or more areas at the videoconferencing endpoint from being shared with a remote endpoint. A view of an endpoint is rendered on a display device. Based on the displayed view, a user enabled to select—in virtual three-dimensions—areas at the endpoint which will not be shared.

During a videoconference, a scene at a videoconferencing system can be captured by an image capture device electronic pan-tilt zoom (EPTZ) camera as a series of image data frames. However, an automated image capture device can sometimes detect and capture more image data than the user wants to broadcast. For example, a room at an endpoint may have a window through which a hallway outside the room is visible to the camera. During a teleconference, the user may desire that people who are inside the room will generally have their images captured and shared, but at the same time desire that people who are outside the room (in the hallway) will not have their images captured and shared because, for example, the people outside the room are not participating in the teleconference. From the point of view of the audience at the remote endpoint, the room is not unlike a stage. The invention enables a user to draw a virtual curtain over the window so that image data from behind the curtain (outside the window) will not be shared, while image data coming from in front of the curtain will be captured and broadcast.

Aspects of this invention pertain to solving the problem of how to configure a videoconferencing device to differentiate between areas at an endpoint that may be suitable for sharing and areas which are not. For example, there may be a door at an endpoint. The user may desire that if the door is opened or if a person walks through the door into the room, such activity will not trigger any action by the videoconferencing system.

Aspects of the invention are directed towards determining what portions of a scene at an endpoint can fall within a region of interest. Some embodiments of the invention are directed towards determining what portion of a conference room will be defined as a region that can be seen by people at a remote endpoint. For example, some conference rooms include glass walls. Glass walls can allow light to pass through them. The system user might desire that when people walk past the conference room, the videoconferencing system will not transmit images of such people to the remote endpoint.

Glass walls can also reflect light, so a glass wall will often cast a reflection of a meeting participant at an endpoint. It can be undesirable to broadcast the reflection. Embodiments of the invention are thus directed to differentiating between a meeting participant who is located between the image capture device (e.g., video camera) and the glass wall (or other reflective surface) and a reflection of that participant or a person (or other object) that is located beyond the glass wall. These principles can best be understood with reference to the following figures.

Figure 1B:
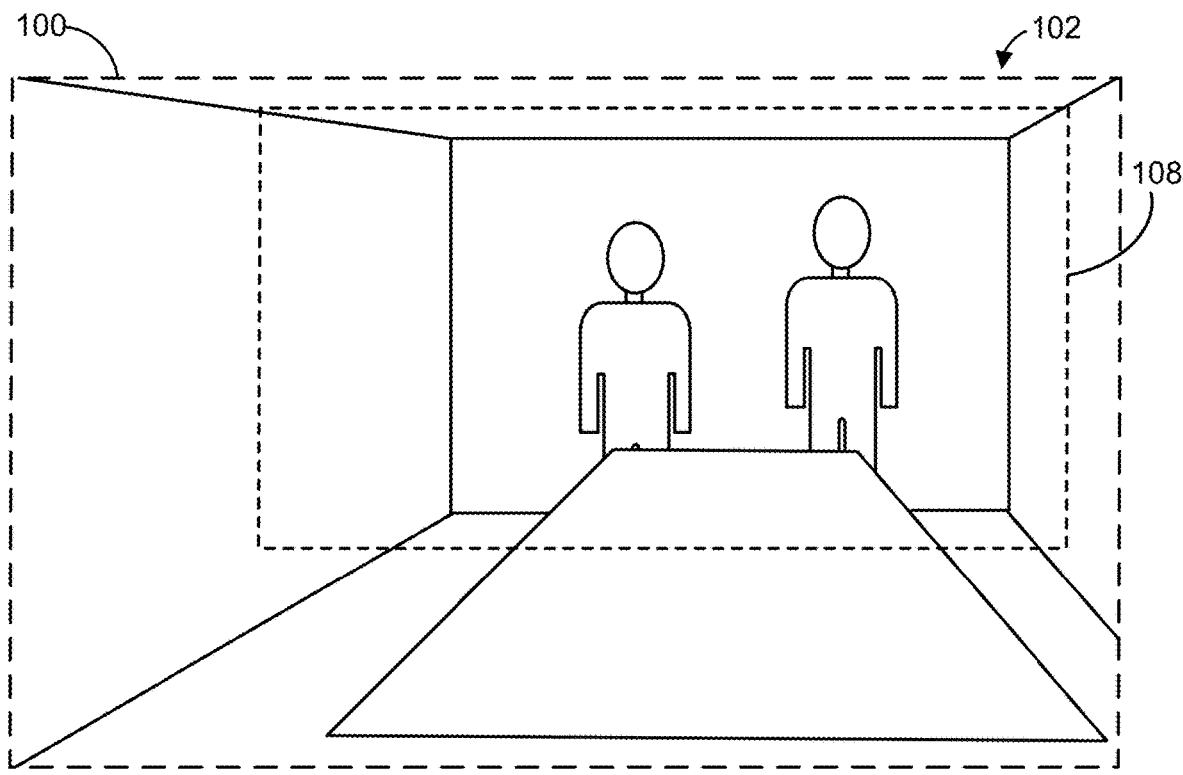
FIG. 1B illustrates the room view of FIG. 1A in which a region of interest has been determined.

FIG. 1A shows an image capture view 100 of a first videoconferencing endpoint 102. There are two people standing in front of a back wall 104. A table 106 is located between the people and the image capture device (not shown) capturing the view 100. Existing framing techniques can determine a region within the view for transmission to a remote endpoint. As illustrated in FIG. 1B, a videoconferencing system could readily select the area 108 within the dashed lines as the region for transmission to a remote endpoint in accordance with a rule of thirds.

Figure 1C:
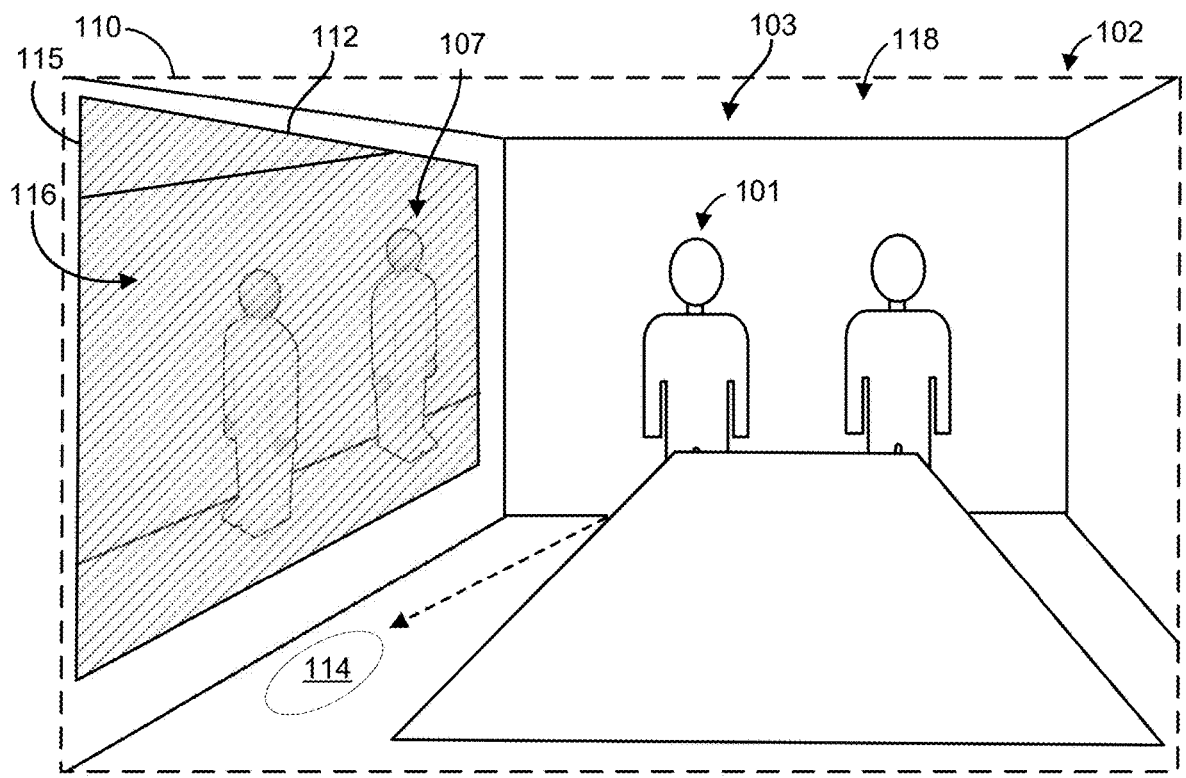
FIG. 1C illustrates a room view in which a region of exclusion has been determined.

FIG. 1C shows another image capture view 110 of the first videoconferencing endpoint 102, but with a distinction—the wall on the left side of the room contains a large glass window 112 (forming a polygon 402) and other people 107 who are not meeting participants are visible through the window 112. One way of dealing with this situation would be to designate a two-dimensional region bounded by the window 112 as an area that will not be shared with the remote endpoint. However, this solution could lead to undesirable results. For example, if the person 101 standing on the left is a meeting participant, it would be unfortunate if she moved to position 114 between the image capture device and the window 112 and she were blocked from view as a result. Embodiments of the invention are thus directed towards a system (200) which will ignore the scene 116 outside the window 112 but will not ignore visual data coming from the scene 103 within the room 118.

Embodiments of the invention include a system (200) that can determine the dimensions of the scene (e.g., 103) captured by the camera (202) using monocular depth estimation techniques, (e.g., shading analysis, feature analyses, line segmentation detection), which take into account the camera's range of focus (focal length). The dimensions of the scene 103 include the distance from the camera (202) to objects within the scene 103, such as the distance from the camera (202) to the window 112. Any object with a fixed size will appear larger in the scene 103 the closer the object gets to the camera and will therefore correspond to a greater pixel height and width of the image capture device. Thus, the head of a person 101 who is standing closer to the camera will have a greater pixel height and pixel width than when that person 101 is standing further away from the camera. For a given camera with a given focal length, the head of a person with an average-sized head will have a pixel height and pixel width which corresponds to the distance from the camera to that person's head. For example, if the average height of the human head is nine inches (e.g., from chin to top of the head), for a given camera with a given focal length capturing a view which is 2160 pixels in height and 3840 pixels wide, the head of a person standing six feet away from the camera (202) could be twenty pixels in height. Thus, if the window 112 in FIG. 1C were six feet away from the camera (202), the people 107 outside the window 112 would have heads which are smaller than twenty pixels in height.

The window 112 of FIG. 1C defines a polygonal region 115 in two-dimensional space. If a user selects the window 112 as defining a 'virtual curtain,' when the system (200) detects a head in the polygonal region which is smaller (in pixels) than a value corresponding to the distance of the window from the camera, the system (200) will ignore the detected head. On the other hand, if the system (200) detects a head in the polygonal region 115 which is taller than the value (e.g., twenty pixels) corresponding to the distance to the window 112, the system (200) will not ignore the head. Instead, in some embodiments, the system (200) will then proceed to determine if the head corresponds to a person who is actively participating in the teleconference. (See e.g., U.S. Pat. No. 9,912,908, entitled 'System and Method for Localizing a Talker Using Audio and Video Information.')

It will thus be understood that in some embodiments of the invention, the system (200) uses pixel quantity of a depiction of an object as an indicator of the distance to that object. The system (200) uses the pixelated dimensions of the head to determine the distance to the head. If the distance to the head is too great, the system (200) will take no action due to detection of the head. If the distance to the head is not too great, then the system will take further action, such as determining whether the head corresponds to a face. Aspects of how the system (200) ignores the scene 116 outside the window 112 but does not ignore visual data coming from within the room 118 are explained in greater detail below.

Figure 1D:
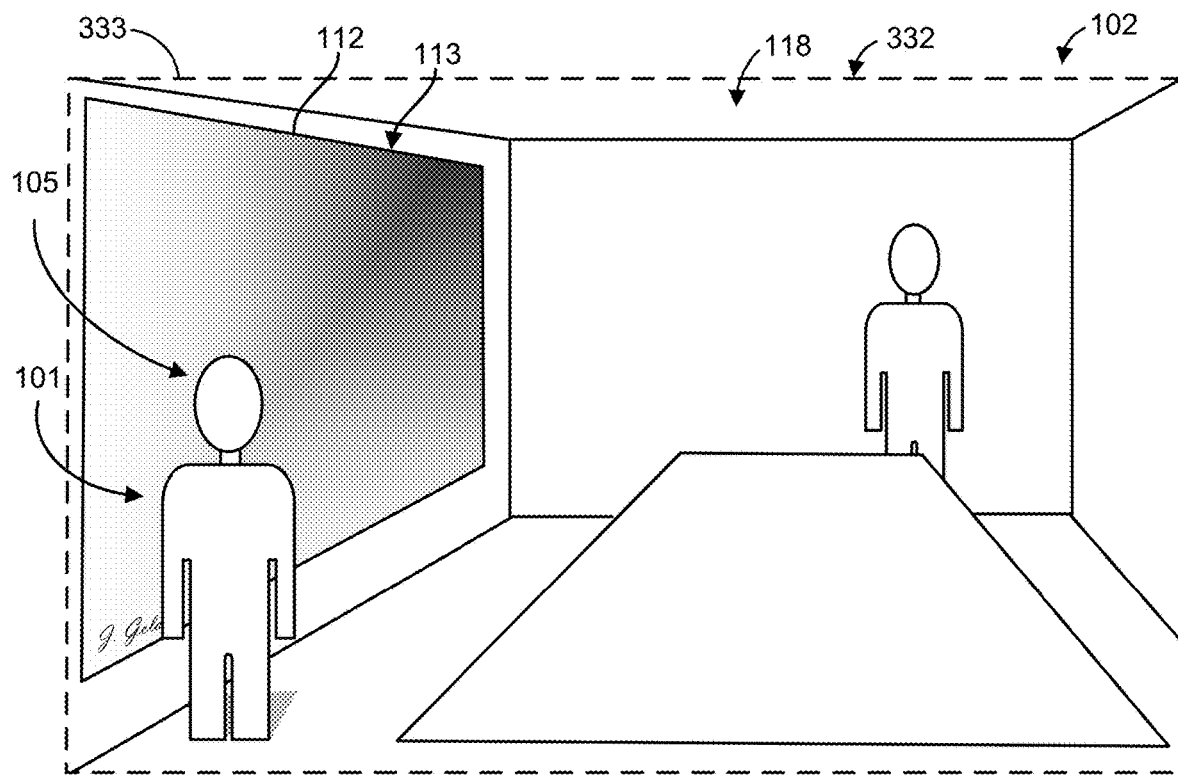
FIG. 1D illustrates a captured image data frame corresponding to the room view of FIG. 1C, as seen at a remote endpoint.

FIG. 1D illustrates an image data frame 332 captured at local videoconferencing endpoint 102 as seen at a remote endpoint. The scene 116 outside the window 112 is not visible. The captured image data frame 332 has been modified 333 so a person at a remote endpoint will see a minimalist painting 113 instead of the window 112. However, a meeting participant (person) 101 standing in front of the window 112 is visible to those at a remote endpoint. In some embodiments, the system (200) will check periodically check for image data corresponding to one or more heads. When the system (200) detects the head 105 of person 101, the system (200) can determine that the person 101 is nearer to the camera than the window 112 because the person's head-size (in pixels) exceeds a threshold established by the distance from the camera to the window 112. Since, as indicated by the pixelated size of the person's head 105, the person 101 is inside the room 103, the system (200) will treat the person 101 as a possible meeting participant.

Figure 2:
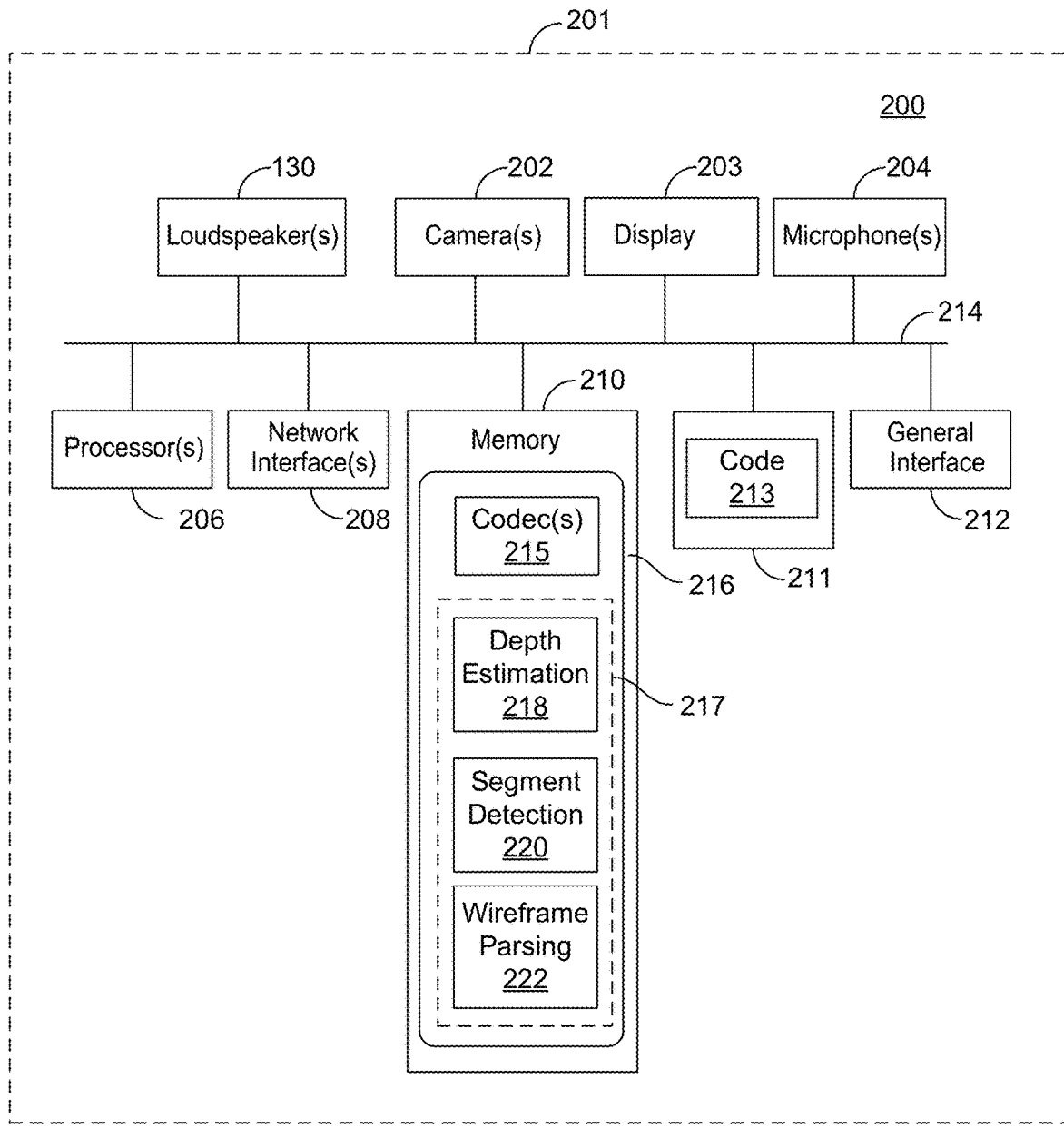
FIG. 2 is a simplified block diagram illustrating a videoconferencing system capable of implementing processes for determining regions as shown in FIG. 1B and FIG. 1C.

FIG. 2 illustrates aspects of a videoconferencing system 200 of a videoconferencing endpoint 201 (e.g., 102) operable to provide to solutions such as those described above. The system 200 includes a loudspeaker 130, EPTZ camera (s) 202 and microphones 204. EPTZ camera 202 is used to capture one or more series of image data frames. Other suitable image capture devices can also be utilized. The system 200 also includes a processor 206, a network interface 208, a memory 210, a storage 211, and an input/output interface 212, all coupled by data bus 214.

The memory 210 can be any type of conventional memory such as synchronous dynamic random-access memory and can store modules 216 in the form of software and firmware for controlling the system 200. (Storage 211 can also store computer program code 213 executable by the processor 206 for controlling the system 200.) In addition to audio and video codecs 215, the modules 216 can include algorithms 217 for establishing blocked regions like scene 116 in FIG. 1C. Algorithms 217 can include depth estimation algorithms 218, segment detection algorithms 220, and wireframe parsing algorithms 222. In addition to the described algorithms 217, the modules 216 can include operating systems, a graphical user interface that enables users to control the system 200, and other algorithms for processing audio signals and video signals as well as controlling the camera 202.

The network interface 208 enables communications between the system 200 and remote endpoints (not shown). In one or more embodiments, the general interface 212 provides data transmission with local devices such as a keyboard, mouse, printer, overhead projector, display, external loudspeakers, additional cameras, and microphone pods, etc.

The camera 202 and the microphone(s) 204 capture video and audio, respectively, in the videoconference environment and produce video and audio signals transmitted through the data bus 214 to the processor 206. In at least one embodiment of this disclosure, the processor 206 processes the video and audio using algorithms 217 in the modules 216. The system 200 processes audio captured by the microphones 204 as well as the video captured by the camera 202 to determine the location of participants (e.g., person 408) and control and select from the views of the camera 202. Processed audio and video can be sent to remote devices coupled to network interface 208 and devices coupled to general interface 212.

Figure 3:
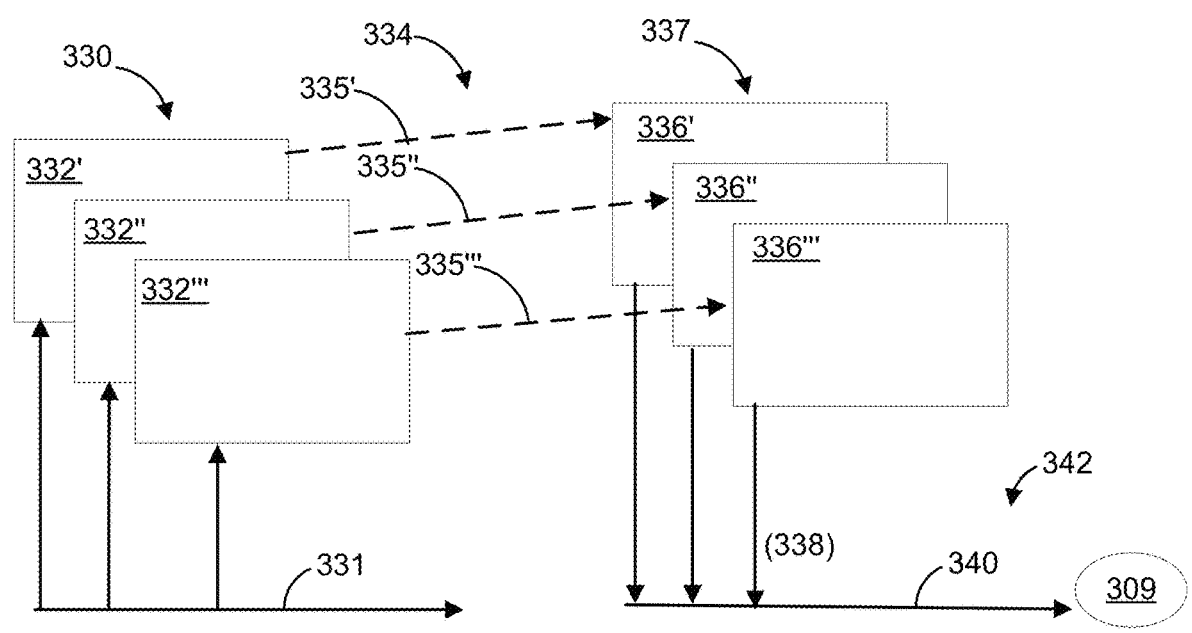
FIG. 3 illustrates a series of frames captured using an image capture device of a videoconferencing system.

FIG. 3 illustrates a series 330 of frames 332 (332', 332" . . . 332''') captured using the image capture device 202 to form a feed 331 of captured video. Each captured frame 332 (e.g., 100, 110) is processed 334 and image data emanating from excluded regions is removed 335 to form modified frames 336 (336', 336" . . . 336'''). The series 337 of modified frames 336 can then be included 338 in data stream 340 for transmission 342 to a remote endpoint 309 or for rendering to a device such as a memory storage 210.

Figure 4A:
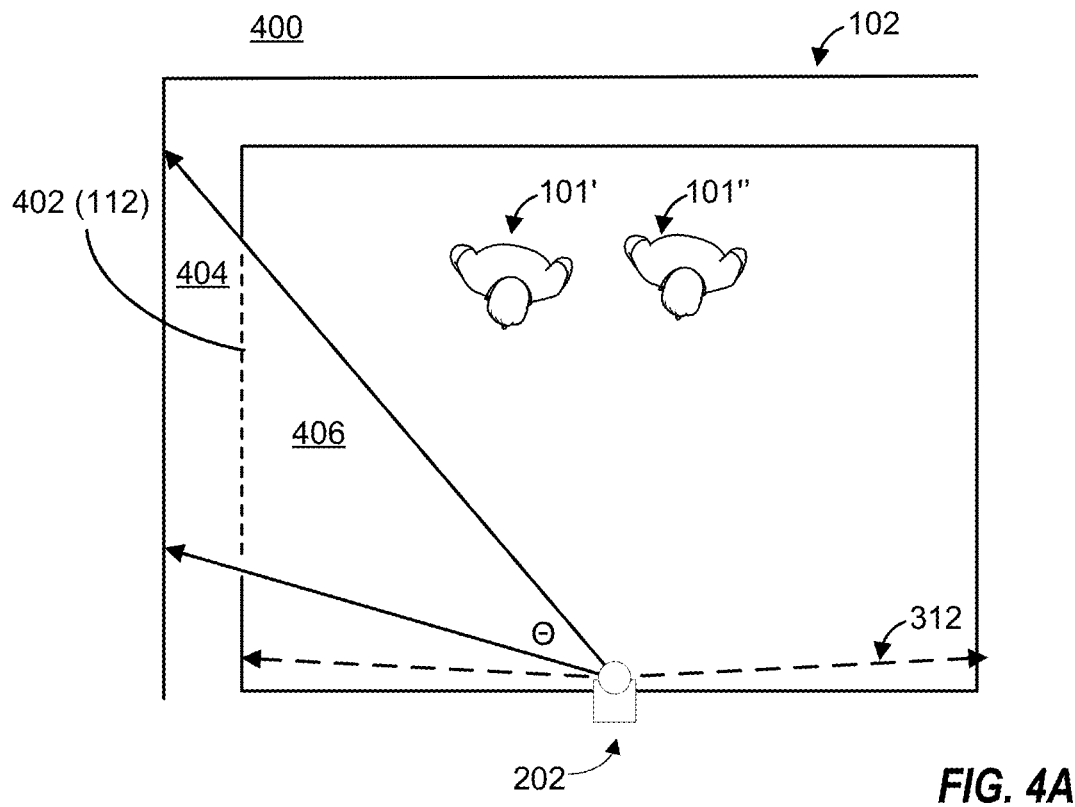
FIG. 4A illustrates a top plan view of an endpoint in which a region of exclusion is being determined.

Returning to the analogy of a theatrical stage, FIG. 4A illustrates aspects of establishing the boundary between what is 'on stage' (sharable) and 'off stage' (not to be shared). FIG. 4A shows a top plan view 400 of videoconferencing endpoint 102. The image capture device 202 has a field of view 312 which is nearly 180 degrees and can capture views having a depth in accordance with the focal length of the lens of the image capture device 202. The system 200 detects the area 402 (polygonal region 115) bounded by the window 112, (see FIG. 1C and FIG. 1D); and the user selects the area 402 as a boundary. The area 404 within angle theta that is outside the window 112 is thereby selected as an area of exclusion. Image data from within the polygon 115 corresponding to area (boundary plane) 402 will only be shared when a head 105 of a person 101 (101', 101") is large enough to indicate that the person's head 105 is closer to the camera 202 than is the window 112. Thus, the system 200 will not share data emanating from area 404, but the system 200 will share visual data coming from people 101 in area 406 as well as from elsewhere in the room 118 outside area 406.

Figure 4B:
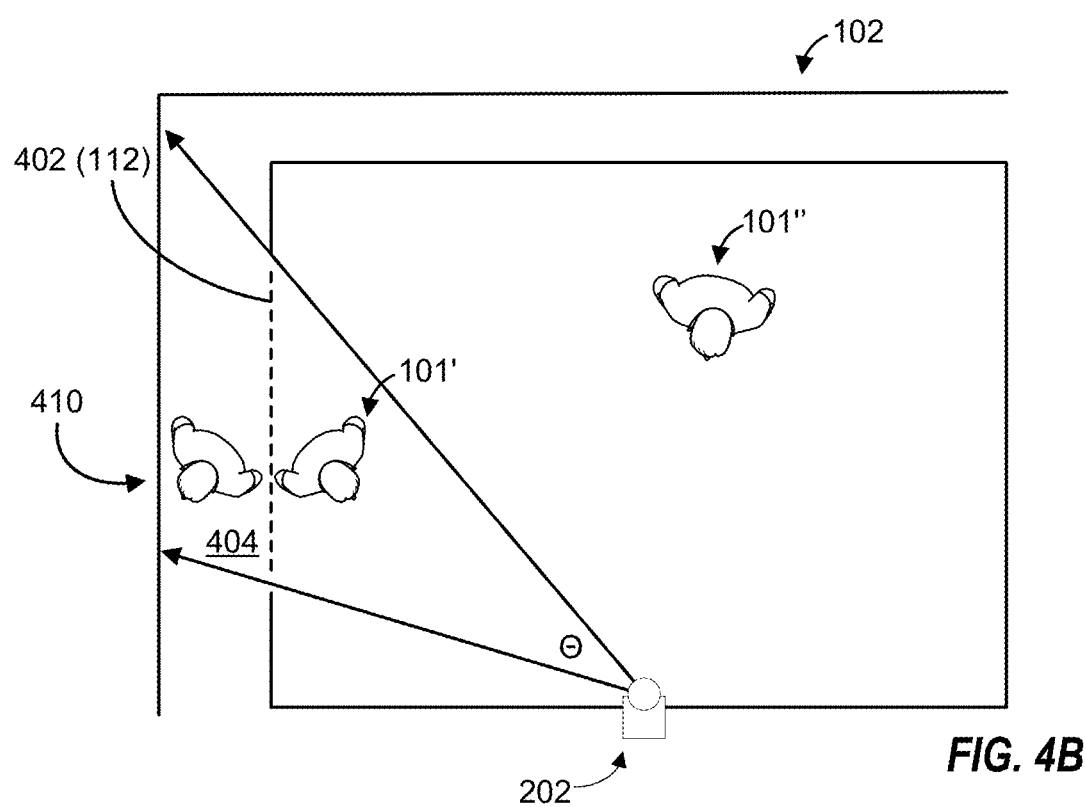
FIG. 4B illustrates a top plan view of the endpoint of FIG. 4A in which a reflection from the region of exclusion is blocked from unwanted transmission to a remote endpoint.

FIG. 4B shows a meeting participant 101' standing near the window 112. The window 112 reflects light coming from the participant 101' back to the image capture device 202 creating a virtual person 410 within area 404. The pixel data of the reflection 410 has the same size and proportions as though coming from a real person standing in area 404 ('off stage') and so the visual data corresponding to the reflection 410 will not be shared with a remote endpoint. That is, the smaller pixelated head size of the virtual person 410 indicates that the virtual person 410 is farther away from the camera 202 than the window 112, whereas the larger pixelated head size of the real person 101 indicates that person 101 is closer to the camera 202 than the window 112.

In some embodiments a process of designating the boundaries (e.g., 402) will be run only once after the videoconferencing system 200 has been emplaced at an endpoint (e.g., 102). In some embodiments, the algorithms associated with designating the boundaries will be executed by the videoconferencing system 200. In some embodiments, some algorithms will be run on one or more remote computing devices which are in signal communication with the videoconferencing system 200, such as through the internet. Such remote devices can use deep learning methods and models to assist the videoconferencing system 200 in designating the boundaries of the stage.

As noted, in some embodiments of the invention, a user is enabled to select portion of a room that will not be seen by the far side. For example, a first videoconference may take place and participants at the endpoint make notes on a whiteboard. The videoconference may be paused so that another group can temporarily use the room for a videoconference with people at a different endpoint, but the writing on the whiteboard should not be shown to people at the different endpoint. Rather than requiring the first group to erase their writing and then start fresh when they resume their meeting, a user at the endpoint can designate the white board as a bounded area so that image data coming from the white board will be obscured or occluded or otherwise not transmitted to the second remote endpoint. Image data coming from the white board could, for example be blurred, or be replaced with different data altogether. The principle of user selection of areas of exclusion is further explained with reference to FIGS. 4A-4D.

Figure 5A:
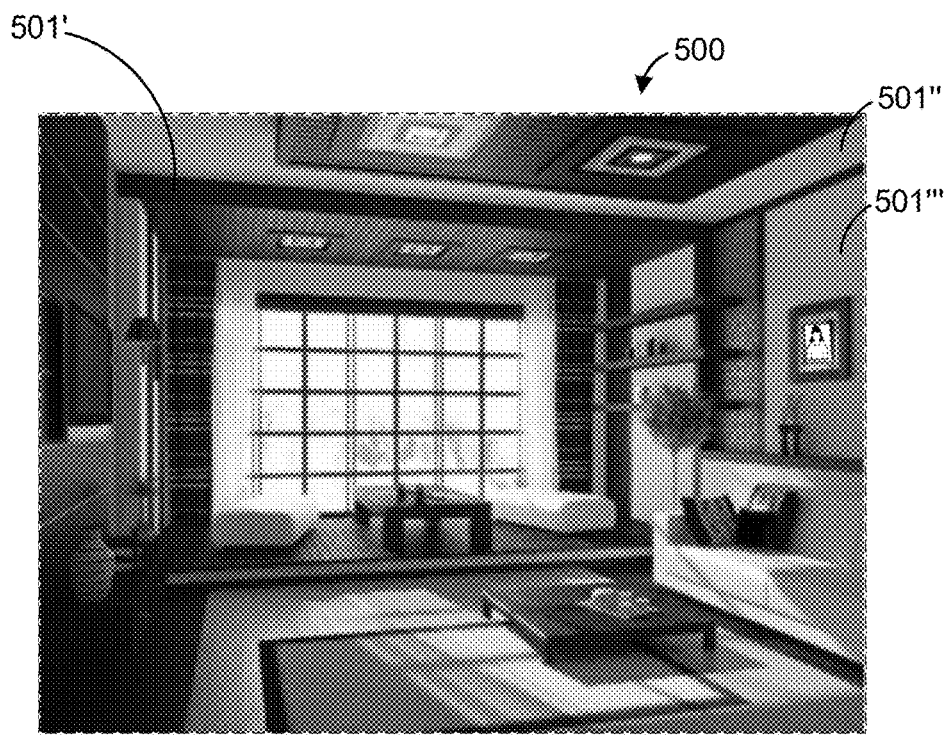
FIGS. 5A-5E illustrate a system in which a user can select areas at an endpoint that will not be shared with a remote endpoint.

FIG. 5A through FIG. 5D illustrate a process by which one or more boundaries (e.g., 402) can be established. FIG. 5A shows a frame 500 (e.g., 332) of captured image data in which the system 200 has detected visual patterns 501 (501', 501").

Figure 5B:
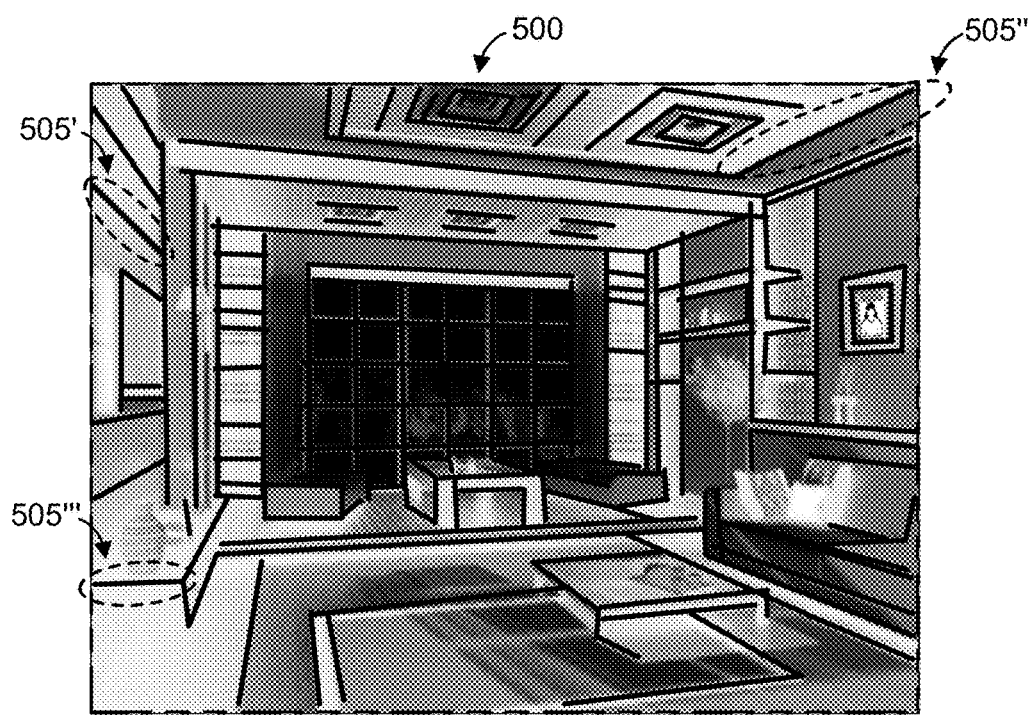

In FIG. 5B, the system 200 has run various analyses of the room view of frame 500 and has detected various straight-line segments 505 (e.g., 505', 505").

Figure 5C:
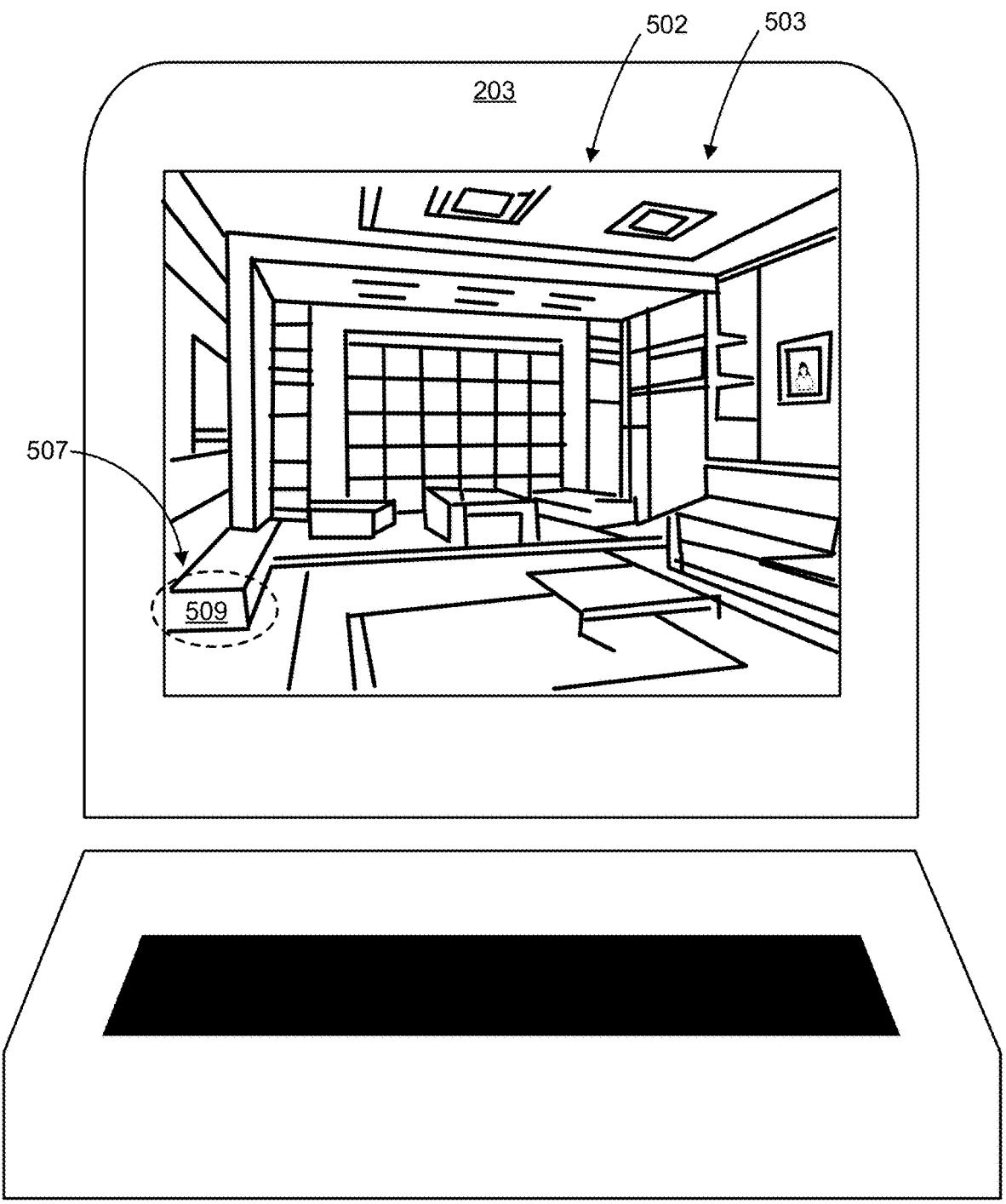

Based on information such as the segments 505, the visual patterns 501, and the focal length of the image capture device 202, the system 200 derives a three-dimensional model 503 corresponding to the room view of frame 500, as illustrated in FIG. 5C. A display device 203 displays a depiction 502 of the three-dimensional model 503. The system 200 determines 507 the presence of one or more planes (e.g., 509).

Figure 5D:
Figure 5E:

Based on the three-dimensional model 503 and visual data of image frame 500, the system 200 designates planes 504, 506, and 508 as (candidate) boundary planes, and the system 200 presents a first user-selectable polygonal plane 504 as shown in FIG. 5D, and a second user-selectable polygonal plane 506 and a third user-selectable polygonal plane 508, as shown in FIG. 5E. If a user selects any of these planes, image data emanating from behind the plane (504, 506, 508) will not be shared with a remote endpoint 309. For example, if polygon 506 is selected as a boundary, when a head is detected in polygonal region 506 the head will be considered as possibly corresponding to a meeting participant only if the pixel height of the head is greater than a value which would indicate the head is closer to the image capture device 202 than the polygonal plane 506. The area which is behind plane 506 is a region of exclusion 404.

Defining a bounding polygonal plane 504, 506, 508 such as in FIG. 5D and FIG. 5E can involve several steps. Firstly, the videoconferencing system 200 will extract the depth (e.g., 403) of the image frame 332 of the image capture device (e.g., 202) using a monocular depth estimation method. Monocular depth estimation methods aim to estimate distances between scene objects and the image capture device from one viewpoint. A discussion of such methods can be found in Deep Learning-Based Monocular Depth Estimation Methods—A State-of-the-Art Review by Faisal Khan et al. (www.ncbi.nlm.nih.gov/pmc/articles/PMC7219073/). Once the depth of the image frame is determined, prominent visual patterns from within the image frame are extracted. In some embodiments of the invention, extraction of prominent visual patterns is achieved using low-level computer vision techniques like line segment detection and wireframe parsing that provide features to facilitate downstream vision tasks such as three-dimensional reconstruction and help in evaluating geometric relationships. Evaluating geometric relationships can be used to determine transition locations between different surfaces, such as from one wall to another, from a wall to a ceiling, from a wall to a floor, and the like. A three-dimensional view is then constructed based on the extracted depth and the prominent visual patterns.

In some embodiments, the three-dimensional view is displayed on a display device 203 such as a monitor and a user can designate which areas (e.g., 406) will be visible to a remote endpoint 309 and which areas (e.g., 404) will not be shared with a remote endpoint 309. While some users might choose to make all image data captured at an endpoint sharable, other users can choose to set a perceptual boundary to be closer to the image capture device than the walls of a meeting room. For example, a user may desire that the back wall of a meeting room and the area near the back wall not be shared because that area is untidy or because that area contains sensitive information. If for example, the wall is a reflective surface, designating the wall as outside the perceptual boundary will prevent reflections emanating from the wall from being shared. In some embodiments pixel data coming from areas outside the virtual boundary will be replaced with other data. Thus, for example, a transparent wall could, in effect, be replaced by a depiction of a real wall. When meeting participant stands in front of the transparent wall, a person at a remote endpoint would perceive the meeting participant as standing in front of a solid wall, while anyone who was behind the glass wall and therefore outside the virtual space would not be visible to the person at the remote endpoint. (See FIG. 1D.)

Figure 6:
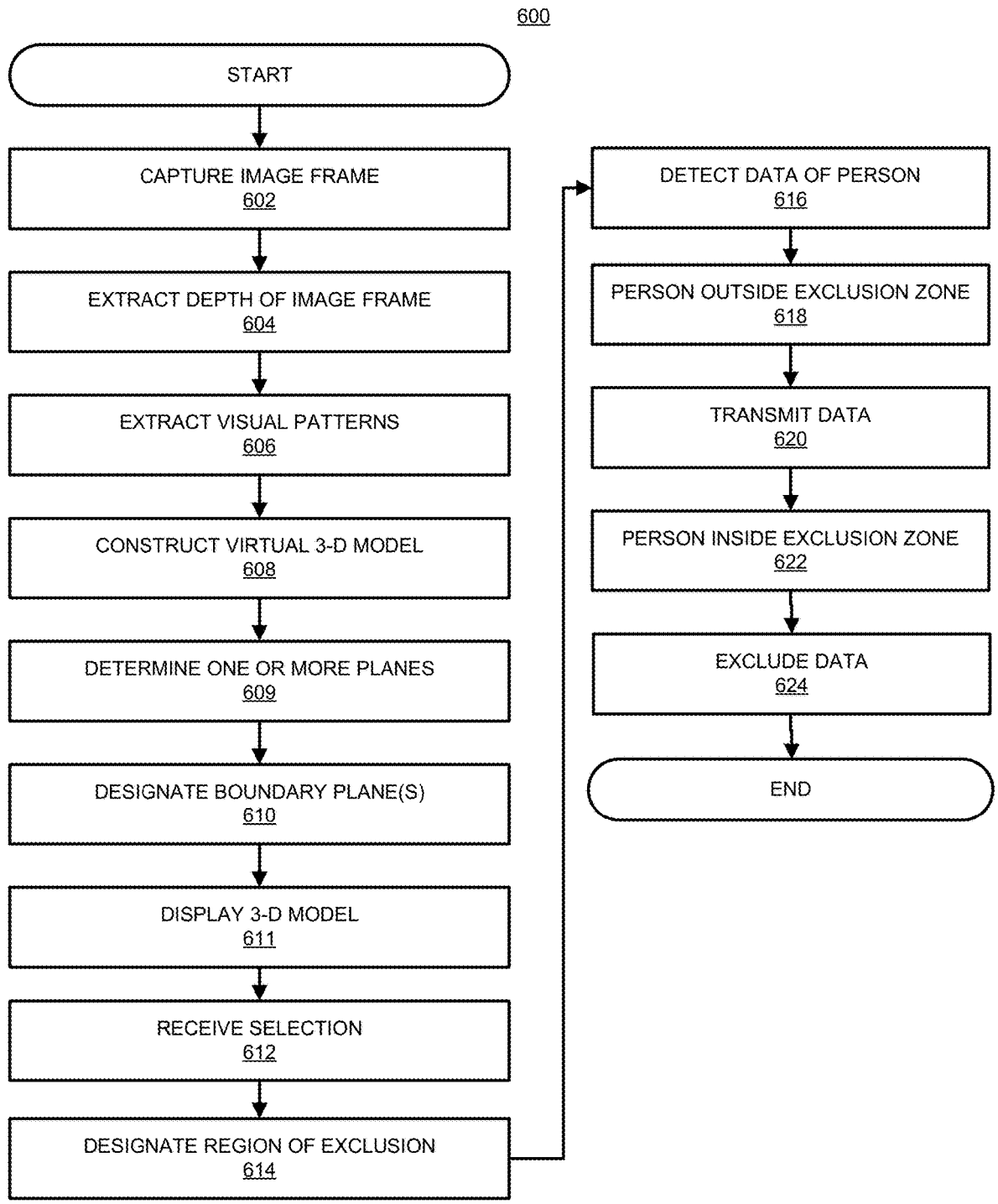
FIG. 6 is a simplified flow diagram illustrating a method for securing image data from unintended disclosure by a videoconferencing endpoint.

FIG. 6 is a simplified flow diagram illustrating a method 600 usable by embodiments of the present invention. Initially, the system captures 602 a frame of image data. Once the frame is captured, the system extracts 604 the depth of the image frame 332, meaning that the distance from image capture device 202 to points in the scene 103 in the image frame 332 is estimated and mapped. In some embodiments of the invention, the system 200 extracts the depth of the image frame in accordance with one or more known monocular depth estimation methods. Additionally, the system extracts 606 visual patterns 501 from the frame of image data. In one or more embodiments of the invention, the system 200 extracts the visual patterns 501 using low-level computer vision techniques such as line segment detection, wireframe parsing, and the like.

The system 200 then constructs 608 a three-dimensional model 503 based on the depth of the image frame and the visual patterns 501. The system determines 609 (e.g., 507) one or more planes 509 of the three-dimensional model 503. The system 200 then displays 611 a depiction of the three-dimensional model 503 on a display device (e.g., 202) containing one or more user-selectable virtual planes (e.g., 506). (The user-selectable planes being a determined subset of the initially determined planes 509.) After the user selects 612 a plane, the system 200 will designate 614 the area behind the plane as a region of exclusion (e.g., 404). In some embodiments, the system 200 will thereafter ignore image data emanating from within the region of exclusion 404. Additionally, in some embodiments a videoconferencing system 200 will replace image data emanating from within the region of exclusion with other image data. For example, when the plane 506 corresponds to a window 112, the system 200 will not be triggered by motion occurring behind the window 112 and instead of transmitting a depiction of the window 112, the system 200 could show a wall. However, image data which emanates from a location nearer to the image capture device 202 than the region of exclusion 404 will still be considered and shared as otherwise appropriate.

For example, if a previously detected meeting participant (e.g., 101) is being tracked (see e.g., U.S. Pat. No. 10,187,579 entitled 'People Detection Method for Auto-framing and Tracking in Video Conference') and that participant's image is being shared, if that meeting participant 101 moves to a location (e.g., 114) at the endpoint 102 which is closer to the image capture device 202 than the plane, the detected meeting participant 101 would continue to be shared with the remote endpoint 309 while the image data coming from the region of exclusion 404 will continue to be unshared.

Returning to the discussion of the method 600, if the system 200 detects 616 image data indicative of a person (such as a head) and determines 618 that the data comes from outside the designated 614 region of exclusion 404 (e.g., the pixel height of the head 105 indicates the head 105 is interposed between the camera 202 and the region of exclusion 404), image data of that person may be transmitted to a remote endpoint 309 once the system 200 identifies the person as a meeting participant 101. On the other hand, if the system 200 determines 622 that the image data indicative of the head 105 corresponds to a pixel height below a threshold corresponding to the boundary plane 404, the system 200 will exclude 624 data indicative of the head 105 from transmission 342 to a remote endpoint 309.

Embodiments of the invention include the following examples:

1. A computer-implementable method (600) for securing image data (331) from unintended disclosure at a videoconferencing endpoint (102) configured to detect meeting participants (101), comprising: capturing (602) a first image data frame (332) using an image capture device (202) of a videoconferencing endpoint (102), the image capture device (202) having a field of view (412), the first image data frame depicting a scene (103) at the videoconferencing endpoint (102); extracting (606), using a processor (206) at the videoconferencing endpoint (102), visual patterns (501', 501") of the scene (103) from the first image data frame (332); generating (608), using the processor (206), a three-dimensional model (503) corresponding to the scene (103); determining (609) one or more planes (509) of the three-dimensional model (503) using the processor at the videoconferencing endpoint (102); designating (610) a plane from among the one or more planes (509) as a boundary plane (402) based, at least in part, on the visual patterns (501', 501") of the first image data frame (332); displaying (611) a depiction (502) of the three-dimensional model (503) using an electronic display device (203), the depiction (502) of the three-dimensional model (503) depicting the boundary plane (402) as a selectable polygon (506); designating (614), based on a selection of the selectable polygon, a region which is behind the boundary plane (402) as a region of exclusion (404), whereby image data emanating from the region of exclusion (404) is excluded from consideration as being indicative of a meeting participant (101).

2. The method (600) of example 1, further comprising excluding (624) captured image data emanating from within the region of exclusion (404) from transmission (342) to a remote endpoint (309).

3. The method (600) of example 1, wherein designating (610) the plane as a boundary plane (402) using the processor (206) comprises executing one or more monocular depth estimation algorithms (218).

4. The method (600) of example 1, wherein designating (610) the plane as a boundary plane (402) further using the processor (206) comprises executing one or more line segmentation algorithms (220).

5. The method (600) of example 1, further comprising: capturing (602) a second image data frame (332) using the image capture device (202) of the videoconferencing endpoint (102), wherein capturing (602) the second image data frame (332) comprises capturing (602) image data emanating from within the region of exclusion (404); modifying (334) the second image data frame (332), wherein modifying (334) the second image data frame (332) comprises replacing the image data emanating from within the region of exclusion (404) with other visual data (113); and transmitting (342) the second image data frame (332) to a remote endpoint (309) as part of a visual data stream (340).

6. The method (600) of example 1, further comprising: capturing (602) a second image data frame (332) using the image capture device (202) of the videoconferencing endpoint (102), wherein capturing (602) the second image data frame (332) comprises capturing (602) image data corresponding to the polygon (506); modifying (334) the second image data frame (332), wherein modifying (334) the second image data frame (332) comprises replacing the image data corresponding to the polygon (506) with other visual data (113); and transmitting (342) the second image data frame (332) to a remote endpoint (309) as part of a visual data stream (340).

7. The method (600) of example 6, wherein the image data emanating from within the region of exclusion (404) corresponds to a reflection (310) of a person (308) located within the field of view (412) and located outside the region of exclusion (404).

8. The method (600) of example 1, further comprising: detecting (616) image data indicative of a first person (308) within the field of view (412); determining (618) that the image data indicative of the first person (308) corresponds to a location outside the region of exclusion (404); and transmitting (342) the image data indicative of the first person (308) to a remote endpoint (309) as part of a visual data stream (340).

9. The method (600) of example 1, further comprising: detecting (616) image data indicative of a head (105) within the polygon (506); determining (622) that the image data indicative of the head (105) corresponds to a pixel height below a threshold corresponding to the boundary plane (402); and excluding (624) the image data indicative of the head (105) from transmission (342) to a remote endpoint (309) as part of a visual data stream (340).

10. The method (600) of example 1, further comprising: detecting (616) image data indicative of a head (105) within the polygon (506); determining (618) that the image data indicative of the head (105) corresponds to a pixel height exceeding a threshold corresponding to the boundary plane (402); and determining, responsive to determining that the image data indicative of the head (105) corresponds to a pixel height exceeding the threshold corresponding to the boundary plane (402), that the image data indicative of the head (105) corresponds to image data indicative of a face.

11. The method of example 1, further comprising: detecting (616) a meeting participant (101) at a first location at the videoconferencing endpoint (102); framing (108) the meeting participant (101) at the first location within a first frame (108); including data of the first frame (108) within a visual stream for transmission (342) to a remote endpoint (309); tracking the meeting participant (101) to a second location (114) at the videoconferencing endpoint (102), the second location (114) closer to the image capture device (202) than the boundary plane (402, 506); framing (108) the meeting participant at the second location within a second frame; including data of the second frame corresponding to the meeting participant within the visual stream; and excluding (624) data of the second frame not corresponding to the meeting participant from the visual stream.

12. The method of example 11, wherein excluding (624) data of the second frame not corresponding to the meeting participant comprises replacing the data of the second frame not corresponding to the meeting participant with other visual data.

13. A videoconferencing system (200), comprising: a processor (206); a display device (203); an image capture device (202) configured to capture a series (330) of visual data frames (332) for processing by the processor (206); a memory (210) configured to store one or more visual data frames (332); a network interface (208) configured to transmit (342) visual data frames (336) to a remote endpoint (309); a data bus (214) coupled to the processor (206), the display device (203), the image capture device (202), the network interface (208), and the memory (210); and a non-transitory, computer-readable storage medium (211), coupled to the data bus (214), and storing instructions (213) executable by the processor (206), the instructions (213) comprising instructions to: capture (602) a first image data frame (332) using the image capture device (202), the first image data frame (332) depicting a scene (103); extract (606) visual patterns (501', 501") of the scene (103) from the first image data frame (332); generate (608) a three-dimensional model (503) corresponding to the scene (103); determine (609) one or more planes (509) of the three-dimensional model (503); designate (610) a plane from among the one or more planes (509) as a boundary plane (402, 506) based, at least in part, on the visual patterns (501', 501") of the first image data frame (232); display (611) a depiction (502) of the three-dimensional model (503) using an electronic display device (203), the depiction (502) of the three-dimensional model (503) depicting the boundary plane (402) as a selectable polygon (506); receive (612), at the processor (206), a selection corresponding to the polygon (506); and designate (614) a region which is behind the plane (402) as a region of exclusion (404), whereby a person (107) located in the region of exclusion (404) is excluded from consideration as a possible meeting participant (101).

14. The videoconferencing system (200) of example 13, the instructions further comprising instructions to exclude captured image data emanating from within the region of exclusion (404) from transmission (342) to a remote endpoint (309).

15. The videoconferencing system (200) of example 13, the instructions further comprising instructions to: detect (620) image data indicative of a head (105) within a field of view of the image capture device (202); determine (622) that the image data indicative of the head (105) corresponds to a pixel height below a threshold corresponding to the boundary plane (402); and exclude (624) the image data indicative of the head (105) from transmission (342) to a remote endpoint (309) as part of a visual data stream (340).

16. The videoconferencing system (200) of example 13, the instructions further comprising instructions to: detect (620) image data indicative of a head (105) within the polygon (606); determine (622) that the image data indicative of the head (105) corresponds to a pixel height exceeding a threshold corresponding to the boundary plane (402); and determine (624), responsive to determining that the image data indicative of the head (105) corresponds to a pixel height exceeding the threshold corresponding to the boundary plane (402), that the image data indicative of the head (105) corresponds to image data indicative of a face.

17. A method of operating a videoconferencing endpoint (102), comprising:

capturing (602) a first image data frame (332) using an image capture device (202) of a videoconferencing endpoint (102), the first image data frame depicting a scene (103) at the videoconferencing endpoint (102); detecting (620) image data indicative of a head (105) within a polygonal region of the first image data frame; determining (622) that the image data indicative of the head (105) corresponds to a pixel height below a threshold corresponding to the polygonal region (506); and excluding (624) the image data indicative of the head (105) from transmission (342) to a remote endpoint (309) as part of a visual data stream (340).

18. The method (600) of example 17, further comprising: detecting (620) second image data indicative of a second head (105) within the polygonal region (506); determining (518) that the second image data indicative of the second head (105) corresponds to a pixel height meeting the threshold; and determining, responsive to determining that the image data indicative of the head (105) corresponds to the pixel height meeting, that the second image data indicative of the second head (105) corresponds to image data indicative of a face.

19. The method of example 17, wherein the polygonal region (506) corresponds to a planar boundary (402) at a predetermined distance from the image capture device (202), and further comprising: detecting (616) a meeting participant at a first location at the videoconferencing endpoint (102); framing (108) the meeting participant at the first location within a first frame; including data of the first frame within a visual stream for transmission (342) to a remote endpoint (309); tracking the meeting participant to a second location at the videoconferencing endpoint (102), the second location closer to the image capture device (202) than the planar boundary; framing (108) the meeting participant at the second location within a second frame; including data of the second frame corresponding to the meeting participant within the visual stream; and excluding (624) data of the second frame not corresponding to the meeting participant from the visual stream.

20. The method of example 19, wherein excluding (624) data of the second frame not corresponding to the meeting participant comprises replacing the data of the second frame not corresponding to the meeting participant with other visual data.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for securing image data from unintended disclosure at a videoconferencing endpoint configured to detect meeting participants, comprising:
    capturing a first image data frame using an image capture device of a videoconferencing endpoint, the image capture device having a field of view, the first image data frame depicting a scene at the videoconferencing endpoint;
    extracting, using a processor at the videoconferencing endpoint, visual patterns of the scene from the first image data frame;
    generating, using the processor, a three-dimensional model corresponding to the scene;
    determining one or more planes of the three-dimensional model using the processor at the videoconferencing endpoint;
    designating a plane from among the one or more planes as a boundary plane based, at least in part, on the visual patterns of the first image data frame;
    displaying a depiction of the three-dimensional model using an electronic display device, the depiction of the three-dimensional model depicting the boundary plane as a selectable polygon;
    designating, based on a selection of the selectable polygon, a region which is behind the boundary plane as a region of exclusion, whereby image data emanating from the region of exclusion is excluded from consideration as being indicative of a meeting participant.

2. The method of claim 1, further comprising excluding captured image data emanating from within the region of exclusion from transmission to a remote endpoint.

3. The method of claim 1, wherein designating the plane as a boundary plane using the processor comprises executing one or more monocular depth estimation algorithms.

4. The method of claim 1, wherein designating the plane as a boundary plane further using the processor comprises executing one or more line segmentation algorithms.

5. The method of claim 1, further comprising:
    capturing a second image data frame using the image capture device of the videoconferencing endpoint, wherein capturing the second image data frame comprises capturing image data emanating from within the region of exclusion;
    modifying the second image data frame, wherein modifying the second image data frame comprises replacing the image data emanating from within the region of exclusion with other visual data; and
    transmitting the second image data frame to a remote endpoint as part of a visual data stream.

6. The method of claim 1, further comprising:
    capturing a second image data frame using the image capture device of the videoconferencing endpoint, wherein capturing the second image data frame comprises capturing image data corresponding to the polygon;
    modifying the second image data frame, wherein modifying the second image data frame comprises replacing the image data corresponding to the polygon with other visual data; and
    transmitting the second image data frame to a remote endpoint as part of a visual data stream.

7. The method of claim 6, wherein the image data emanating from within the region of exclusion corresponds to a reflection of a person located within the field of view and located outside the region of exclusion.

8. The method of claim 1, further comprising:
    detecting image data indicative of a first person within the field of view;
    determining that the image data indicative of the first person corresponds to a location outside the region of exclusion; and
    transmitting the image data indicative of the first person to a remote endpoint as part of a visual data stream.

9. The method of claim 1, further comprising:
    detecting image data indicative of a head within the polygon;
    determining that the image data indicative of the head corresponds to a pixel height below a threshold corresponding to the boundary plane; and
    excluding the image data indicative of the head from transmission to a remote endpoint as part of a visual data stream.

10. The method of claim 1, further comprising:
    detecting image data indicative of a head within the polygon;
    determining that the image data indicative of the head corresponds to a pixel height exceeding a threshold corresponding to the boundary plane; and
    determining, responsive to determining that the image data indicative of the head corresponds to a pixel height exceeding the threshold corresponding to the boundary plane, that the image data indicative of the head corresponds to image data indicative of a face.

11. The method of claim 1, further comprising:
    detecting a meeting participant at a first location at the videoconferencing endpoint;
    framing the meeting participant at the first location within a first frame;
    including data of the first frame within a visual stream for transmission to a remote endpoint;
    tracking the meeting participant to a second location at the videoconferencing endpoint, the second location closer to the image capture device than the boundary plane;
    framing the meeting participant at the second location within a second frame;
    including data of the second frame corresponding to the meeting participant within the visual stream; and
    excluding data of the second frame not corresponding to the meeting participant from the visual stream.

12. The method of claim 11, wherein excluding data of the second frame not corresponding to the meeting participant comprises replacing the data of the second frame not corresponding to the meeting participant with other visual data.

13. A videoconferencing system, comprising:
    a processor;
    a display device;
    an image capture device configured to capture a series of visual data frames for processing by the processor;
    a memory configured to store one or more visual data frames;
    a network interface configured to transmit visual data frames to a remote endpoint;
    a data bus coupled to the processor, the display device, the image capture device, the network interface, and the memory; and a non-transitory, computer-readable storage medium, coupled to the data bus, and storing instructions executable by the processor, the instructions comprising instructions to:

capture a first image data frame using the image capture device, the first image data frame depicting a scene;

extract visual patterns of the scene from the first image data frame;

generate a three-dimensional model corresponding to the scene;

determine one or more planes of the three-dimensional model;

designate a plane from among the one or more planes as a boundary plane based, at least in part, on the visual patterns of the first image data frame;

display a depiction of the three-dimensional model using an electronic display device, the depiction of the three-dimensional model depicting the boundary plane as a selectable polygon;

receive, at the processor, a selection corresponding to the polygon; and designate a region which is behind the plane as a region of exclusion, whereby a person located in the region of exclusion is excluded from consideration as a possible meeting participant.

14. The videoconferencing system of claim 13, the instructions further comprising instructions to exclude captured image data emanating from within the region of exclusion from transmission to a remote endpoint.

15. The videoconferencing system of claim 13, the instructions further comprising instructions to:

detect image data indicative of a head within a field of view of the image capture device;

determine that the image data indicative of the head corresponds to a pixel height below a threshold corresponding to the boundary plane; and exclude the image data indicative of the head from transmission to a remote endpoint as part of a visual data stream.

16. The videoconferencing system of claim 13, the instructions further comprising instructions to:

detect image data indicative of a head within the polygon;

determine that the image data indicative of the head corresponds to a pixel height exceeding a threshold corresponding to the boundary plane; and determine, responsive to determining that the image data indicative of the head corresponds to a pixel height exceeding the threshold corresponding to the boundary plane, that the image data indicative of the head corresponds to image data indicative of a face.

17. A method of operating a videoconferencing endpoint, comprising:

capturing a first image data frame using an image capture device of a videoconferencing endpoint, the first image data frame depicting a scene at the videoconferencing endpoint;

detecting image data indicative of a head within a polygonal region of the first image data frame;

determining that the image data indicative of the head corresponds to a pixel height below a threshold corresponding to the polygonal region;

excluding the image data indicative of the head from transmission to a remote endpoint as part of a visual data stream;

detecting second image data indicative of a second head within the polygonal region;

determining that the second image data indicative of the second head corresponds to a pixel height meeting the threshold; and determining, responsive to determining that the image data indicative of the head corresponds to the pixel height meeting, that the second image data indicative of the second head corresponds to image data indicative of a face;

designating a plane as a boundary plane based, at least in part, on the visual patterns of the first image data frame;

displaying a depiction of the three-dimensional model using an electronic display device, the depiction of the three-dimensional model depicting the boundary plane as a selectable polygon; and designating, based on a selection of the selectable polygon, a region which is behind the boundary plane as a region of exclusion, whereby image data emanating from the region of exclusion is excluded from consideration as being indicative of a meeting participant.

18. A method of operating a videoconferencing endpoint, comprising:

capturing a first image data frame using an image capture device of a videoconferencing endpoint, the first image data frame depicting a scene at the videoconferencing endpoint;

detecting image data indicative of a head within a polygonal region of the first image data frame;

determining that the image data indicative of the head corresponds to a pixel height below a threshold corresponding to the polygonal region;

excluding the image data indicative of the head from transmission to a remote endpoint as part of a visual data stream;

wherein the polygonal region corresponds to a planar boundary at a predetermined distance from the image capture device, and further comprising:

detecting a meeting participant at a first location at the videoconferencing endpoint;

framing the meeting participant at the first location within a first frame;

including data of the first frame within a visual stream for transmission to a remote endpoint;

tracking the meeting participant to a second location at the videoconferencing endpoint, the second location closer to the image capture device than the planar boundary;

framing the meeting participant at the second location within a second frame;

including data of the second frame corresponding to the meeting participant within the visual stream; and excluding data of the second frame not corresponding to the meeting participant from the visual stream.

19. The method of claim 18, wherein excluding data of the second frame not corresponding to the meeting participant comprises replacing the data of the second frame not corresponding to the meeting participant with other visual data.

* * * * *